United States Patent
Zaika et al.

(10) Patent No.: US 8,386,929 B2
(45) Date of Patent: Feb. 26, 2013

(54) PERSONAL ASSISTANT FOR TASK UTILIZATION

(75) Inventors: Igor Zaika, Seattle, WA (US); Ned B. Friend, Seattle, WA (US); Erez Kikin-Gil, Redmond, WA (US); Matthew J. Kotler, Sammamish, WA (US); Charles W. Parker, Sammamish, WA (US); Jesse Clay Satterfield, Seattle, WA (US); Marta Rey-Babarro, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 12/820,600

(22) Filed: Jun. 22, 2010

(65) Prior Publication Data

US 2011/0314375 A1 Dec. 22, 2011

(51) Int. Cl.
*G06F 3/00* (2006.01)
*G06F 17/30* (2006.01)

(52) U.S. Cl. ........ 715/705; 715/205; 715/234; 715/256; 715/762; 707/805; 707/E17.005

(58) Field of Classification Search .......... 715/200, 715/201, 202, 205, 207, 210, 212, 229, 230, 715/231, 234, 253, 254, 255, 256, 261, 262, 715/273, 738, 739, 740, 744, 752, 760, 762, 715/763, 764, 778, 779, 804, 805, 809, 203, 715/204, 226, 700, 702, 705, 708; 707/705, 707/726, 805, 999.001, 999.107, E17.005
See application file for complete search history.

(56) References Cited

U.S. PATENT DOCUMENTS

| | | | |
|---|---|---|---|
| 6,047,260 A | 4/2000 | Levinson | |
| 6,300,950 B1 * | 10/2001 | Clark et al. | 715/705 |
| 6,307,544 B1 * | 10/2001 | Harding | 715/709 |
| 6,680,675 B1 | 1/2004 | Suzuki | |
| 6,757,362 B1 | 6/2004 | Cooper et al. | 379/88.01 |
| 7,047,498 B2 * | 5/2006 | Lui et al. | 715/762 |
| 7,103,559 B2 | 9/2006 | Worthington | |

(Continued)

FOREIGN PATENT DOCUMENTS

| | | |
|---|---|---|
| WO | WO 01/13069 A1 | 2/2001 |
| WO | WO 03/107129 A2 | 12/2003 |

OTHER PUBLICATIONS

Mistry, Pranav, et al. "Augmenting Sticky Notes as an I/O Interface", MIT Media Laboratory, 20 Ames Street, Cambridge, MA 02139. Published Jul. 14, 2009, http://fluid.media.mit.edu/assets/_pubs/p2217_mistry.pdf, 10 pages.

(Continued)

*Primary Examiner* — Maikhanh Nguyen
(74) *Attorney, Agent, or Firm* — Merchant & Gould

(57) ABSTRACT

An electronic personal assistant that uses task information to obtain task performance assistance and help content is provided. Tasks from an electronic tasks application may be utilized by the personal assistant application to search a variety of information sources for task performance functionality and help content related to the tasks. The personal assistant may provide functionality to help a user actually perform a given task. Alternatively, once help content is obtained, a new task may be generated or the related task may be modified to provide the help content or to provide a link to the help content. The personal assistant application may provide the help content in a separate user interface or cause an application from which the help content is obtained to be launched.

20 Claims, 10 Drawing Sheets

U.S. PATENT DOCUMENTS

| | | | |
|---|---|---|---|
| 7,565,340 B2 | 7/2009 | Herlocker et al. | |
| 7,587,668 B2* | 9/2009 | Bala | 715/234 |
| 7,610,365 B1 | 10/2009 | Kraft et al. | 709/223 |
| 7,797,267 B2 | 9/2010 | Horvitz | |
| 7,818,197 B2 | 10/2010 | Cho et al. | |
| 7,975,239 B2 | 7/2011 | Bellotti et al. | |
| 8,108,206 B2 | 1/2012 | Hufnagel et al. | |
| 8,161,386 B1* | 4/2012 | Mark | 715/712 |
| 2002/0054130 A1 | 5/2002 | Abbott et al. | |
| 2002/0194246 A1 | 12/2002 | Moskowitz et al. | |
| 2004/0187082 A1* | 9/2004 | Hathaway | 715/531 |
| 2005/0091578 A1 | 4/2005 | Madan et al. | |
| 2005/0108074 A1 | 5/2005 | Bloechl et al. | |
| 2005/0138559 A1* | 6/2005 | Santos-Gomez et al. | 715/709 |
| 2005/0138631 A1* | 6/2005 | Bellotti et al. | 719/310 |
| 2005/0256754 A1 | 11/2005 | Nastacio | |
| 2005/0268234 A1* | 12/2005 | Rossi et al. | 715/705 |
| 2006/0069604 A1 | 3/2006 | Leukart et al. | |
| 2006/0074844 A1 | 4/2006 | Frankel et al. | |
| 2006/0136280 A1 | 6/2006 | Cho et al. | |
| 2006/0184880 A1* | 8/2006 | Bala | 715/705 |
| 2006/0225076 A1 | 10/2006 | Longobardi | |
| 2006/0242586 A1 | 10/2006 | McGlinchey et al. | |
| 2006/0259511 A1 | 11/2006 | Boerries et al. | |
| 2006/0265294 A1 | 11/2006 | de Sylva | 705/28 |
| 2007/0028170 A1* | 2/2007 | Wessling et al. | 715/705 |
| 2007/0073810 A1 | 3/2007 | Adams et al. | |
| 2007/0130026 A1 | 6/2007 | O'Pray et al. | 705/27 |
| 2007/0130186 A1 | 6/2007 | Ramsey et al. | |
| 2007/0130369 A1 | 6/2007 | Nayak | |
| 2007/0143376 A1 | 6/2007 | McIntosh | |
| 2007/0162907 A1 | 7/2007 | Herlocker et al. | |
| 2007/0282658 A1 | 12/2007 | Brintle | |
| 2007/0288279 A1 | 12/2007 | Haugen et al. | |
| 2008/0005055 A1 | 1/2008 | Horvitz | |
| 2008/0046862 A1 | 2/2008 | Sattler et al. | |
| 2008/0076400 A1 | 3/2008 | Moosavi et al. | |
| 2008/0082651 A1 | 4/2008 | Singh et al. | |
| 2008/0091782 A1 | 4/2008 | Jakobson | |
| 2008/0162160 A1 | 7/2008 | Singh et al. | |
| 2008/0175104 A1 | 7/2008 | Grieb et al. | |
| 2008/0281901 A1 | 11/2008 | Lusher et al. | |
| 2009/0013255 A1* | 1/2009 | Yuschik et al. | 715/728 |
| 2009/0157617 A1 | 6/2009 | Herlocker et al. | |
| 2009/0157653 A1 | 6/2009 | Herlocker et al. | |
| 2009/0287718 A1 | 11/2009 | Motoyama et al. | |
| 2009/0287731 A1 | 11/2009 | Motoyama et al. | |
| 2009/0300494 A1* | 12/2009 | Cottingham et al. | 715/708 |
| 2009/0319608 A1 | 12/2009 | Anil et al. | |
| 2009/0320025 A1 | 12/2009 | Ferguson et al. | |
| 2010/0004921 A1 | 1/2010 | Hufnagel et al. | |

OTHER PUBLICATIONS

Radi, Harald, et al. "Towards Alternative User Interfaces for Capturing and Managing Tasks with Mobile Devices", MoMM 2008, Nov. 24-26, 2008, Linz, Austria. http://www.mayrhofer.eu.org/downloads/ pubications/MoMM2008-Towards-Mobile-Task-Management.pdf, 4 pages.

Smartcode, "Dynamic Notes 3.46", Published 2008, http://dynamicnotes.smartcode.com/info.html, 2 pages.

SnapFiles, "SmartToDo Personal Task Manager", Published Jan. 23, 2009, http://www.snapfiles.com/get/smarttodo.html, 3 pages.

Back, Maribeth, et al. Prototyping a tangible tool for design: Multimedia e-paper sticky notes, FX Palo Alto Laboratory, Palo Alto, California. Published 2009. http://www.fxpal.com/publications/FXPAL-PR-09-499.pdf, 12 pages.

Conley, K. et al. Towel: Towards an Intelligent To-Do List, IN: the AAAI Spring Symposium on Interaction Challenges for Artificial Assistants, 7 pgs., 2007.

Pauline M. Berry et al., A Personalized Calendar Assistant, http://ai.sri.com/~gervasio/pubs/berry-ss04.pdf, 6pgs, 2004.

Andrew Faulring et al., Visualizing and Manipulating Complex Calendar Scheduling Information, http://scholar.google.com/scholar?hl=en&lr=&q=cache:XQivLN8UOXkJ:www.cs.cmu.edu/~faulring/papers/cal-sched-dis06.pdf+tasks+calendar+organize+, 8pgs., 2006.

Victoria Bellotti et al., What a to-do: studies of task management towards the design of a personal task list manager, http://portal.acm.org/citation.cfm?id=985692.985785, 8pgs., Apr. 2004.

Kreifelts, Thomas et al., "Sharing To-Do Lists with a Distributed Task Manager", published in ECSCW '93, Proc. Third European Conference on Computer-Supported Cooperative Work on Sep. 15-17, 1993, Milano, Italy. Reprinted by permissions of Kluwer Academic Publishers, http://citeseerx.ist.psu.edu/viewdoc/download;jessionid=8058BDB7D6CD9F588E557272F2BB39C8?doi=10.1.1.38.2100&rep=rep1&type=pdf, 16 pages.

To-Do List Pro—Published Date: Jul. 23, 2010, http://appshopper.com/productivity/to-do-list-pro-time-tracker, 2 Pages.

International Search Report and Written Opinion for PCT/US2011/040790 mailed Feb. 17, 2012. 9 pages.

Bergman, Ruth, et al., "A personal Email Assistant", Software Technology Laboratory, HP Laboratories Palo Alto, Aug. 22, 2002, http://www.hpl.hp.com/techreports/2002/HPL-2002-236.pdf, 23 pages.

Myers, Karen, et al., "An Intelligent Personal Assistant for Task and Time Management", Aug. 7, 2006, http://www.eecs.umich.edu/~pollackm/distrib/aimag06.pdf, 19 pages.

* cited by examiner

PERSONAL ASSISTANT FOR TASK UTILIZATION

BACKGROUND

With the advent of computers and computer software, a number of advancements have been made to help people manage both their working and non-working lives. To help people who are trying to juggle numerous tasks at work, at home, and in between, electronic tasks and calendaring programs have been developed to assist with the often daunting task of maintaining, tracking and remembering all the things that must be accomplished on a daily basis. In addition to the large number of tasks people typically must accomplish on a daily basis, many tasks may be difficult to accomplish because completion of the tasks requires help information or assistance on various levels. For example, a simple task of picking up flowers after work can be difficult if the user does not know of a local or otherwise accessible florist. For another example, a person may be working on a school or work project, but are not sure which software application to use, for example, a word processing application, a slide presentation application, a spreadsheet application, or the like.

It is with respect to these and other considerations that the present invention has been made.

SUMMARY

Embodiments of the present invention solve the above and other problems by providing an electronic personal assistant that uses task information to obtain task performance assistance and help content. According to one embodiment, tasks from and electronic tasks application may be utilized by a personal assistant application to search a variety of information sources for actions related to the tasks. For example, for a task of "prepare school flyer" is in a user's task list, the personal assistant may search available information sources and may automatically launch a desktop publishing application and suggested template for making a flyer to assist the user in accomplishing the task.

According to another embodiment, tasks from an electronic tasks application may be utilized by a personal assistant application to search a variety of information sources for help content related to the tasks. For example, the personal assistant application may use a task such as "pick up flowers after work" to search Internet sites for florists in the user's local area. Once help content is obtained, a new task may be generated or the related task may be modified to provide the help content or to provide a link to the help content. Alternatively, the personal assistant application may provide the help content in a separate user interface or cause an application from which the help content is obtained to be launched.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
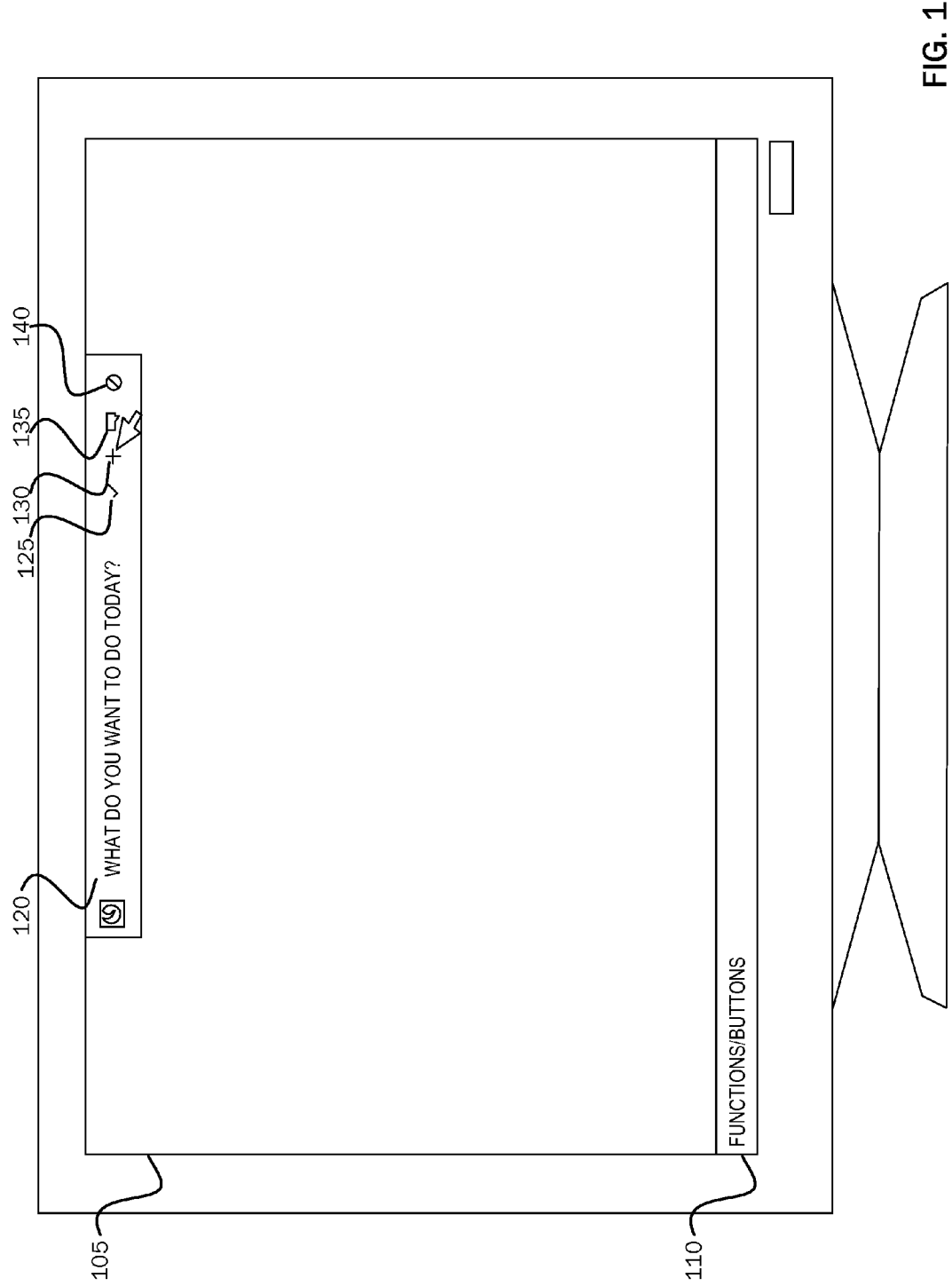
FIG. 1 is a simplified block diagram illustrating a list authoring surface user interface deployed on a display screen of a computer monitor.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to an electronic personal assistant that uses task information to obtain help content. Tasks from an electronic tasks application may be utilized by a personal assistant application to search a variety of information sources for help content related to the tasks. Once help content is obtained, a new task may be generated or the related task may be modified to provide the help content or to provide a link to the help content.

FIG. 1 is a simplified block diagram illustrating the list authoring surface user interface deployed on a display screen of a computer monitor. The list authoring surface includes a lightweight user interface 120 (also referred to herein as a list user interface) that may be deployed across a number of software applications and that may be displayed on stationary and/or mobile computing device desktops or display areas. For example, as illustrated in FIG. 1, the list authoring surface user interface (LASUI) is shown deployed on a display screen 105 of a stationary computer monitor. As should be appreciated, the display screen 105 may be illustrative of a display space associated with a computer operating system, or a display space associated with one or more software applications, for example, word processing applications, spreadsheet applications, slide presentation applications, notes applications, calendaring applications, contacts applications, and the like. A row of functions/buttons 110 is illustrated at the bottom edge of the display screen 105 for providing access to one or more functionalities associated with an example software application or operating system. As should be appreciated, the configuration and location of user interface components illustrated in FIG. 1 are for purposes of example only and are not limiting of other configurations that may be possible. That is, the LASUI 120 may be deployed along an upper edge of the display screen 105, as illustrated in FIG. 1, or the LASUI 120 may be deployed at other locations in the display screen as required by a user for effective utilization of the display screen.

According to embodiments, the list user interface 120 of the list authoring surface may be utilized as an electronic note, scrap of paper, note pad, "sticky" note, and the like that is associated with one or more software application displays for entering either manually or automatically list items, such as tasks, events, activities or other pieces of information, that a user might otherwise jot down on a piece of paper, note or other media for keeping in the forefront such information considered important to the user or for reminding the user. In addition to entering information into the user interface 120, the user interface 120 may be used for quick capture of information from opened documents and in association with opened applications so that the user does not have to leave a current application to launch a task entry user interface. Indeed, the list authoring surface UI 120 may be associated with a variety of electronic files, such as electronic documents, electronic mail items, contacts items, social networking information, and the like.

As illustrated in FIG. 1, one or more functionality buttons or controls 125, 130, 135, 140 may be provided in the list authoring surface UI 120 for editing or otherwise manipulating information contained in the UI 120. For example, a control 125 may be utilized for "checking off" completed tasks, a control 130 may be utilized for adding additional tasks, events or other information, a control 135 may be utilized for importing information or for annotating information to be stored or displayed in the user interface 120, and a variety of other controls 140 may be provided for other types of editing, sorting, filtering, searching, and the like information contained in the user interface 120.

According to an embodiment, one such control may be used to set the computer with which the list authoring surface is utilized to a "do not disturb" mode so no new email items, instant messaging (IM) items, or other distractions would come to the list authoring surface when the "do not disturb" mode is activated. Another such control 140 may allow a "snooze" mode to be applied to the task currently displayed so that a new task could be displayed instead and so that a user would not have to decide what to do with respect to the "snooze" task. That is, the user could hold the task by applying the "snooze" mode. In addition, the "snooze" mode may be used to filter out information not relevant to the current task only. For example, if a user applies the "snooze" mode to a task of "Plan morale event," and if the user's current task is "Redesign product," and the user gets an email from his/her supervisor about this project, the email about the task of "Redesign project" may be displayed, but emails about the "Plan morale event" task may not be displayed to the user.

Figure 2:
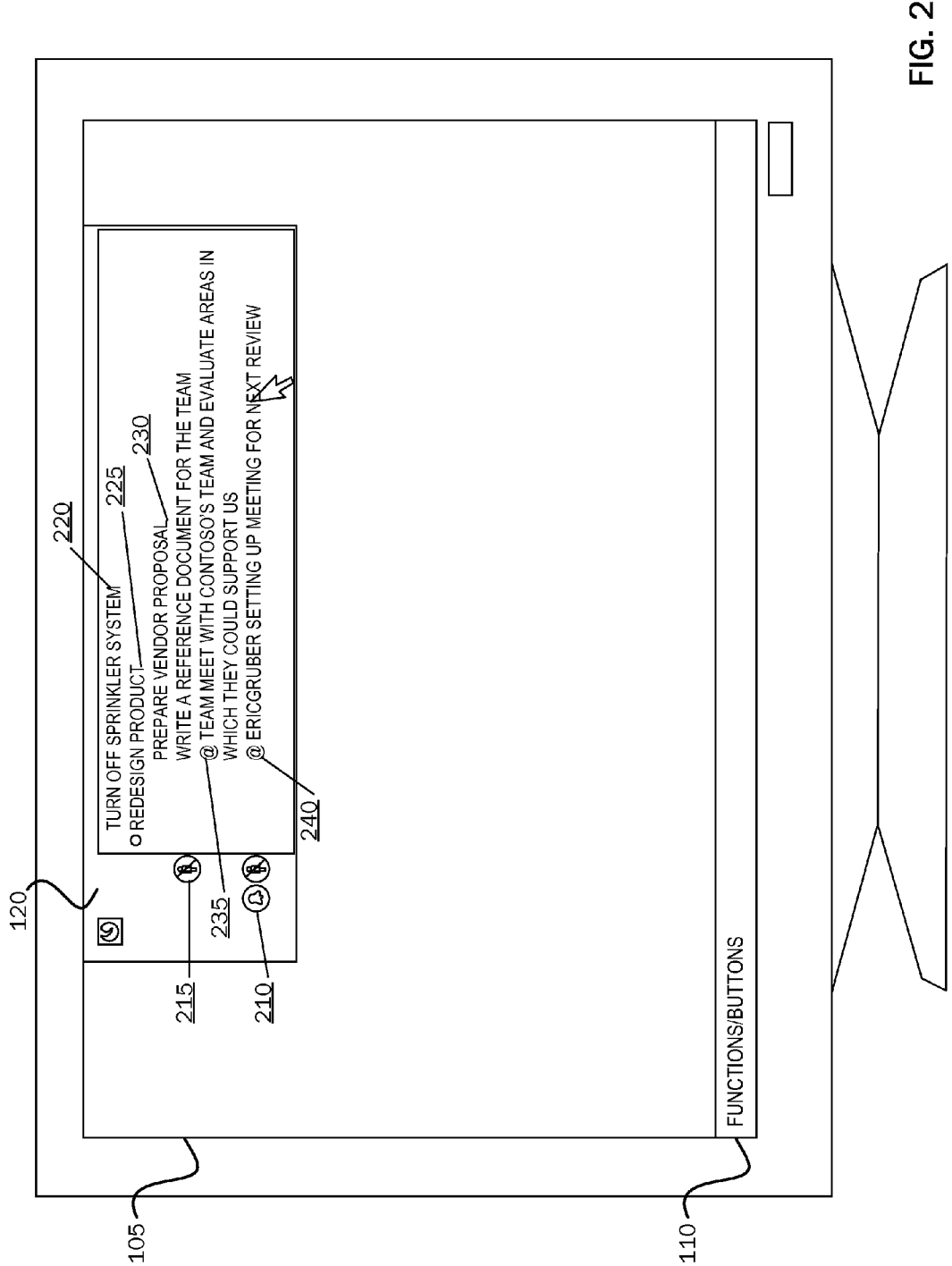
FIG. 2 is a simplified block diagram illustrating a list authoring surface user interface populated with one or more tasks, events, activities, or pieces of information deployed on a display screen of a computer monitor.

Referring now to FIG. 2, the list authoring surface user interface 120 is illustrated in an expanded form showing a variety of list items, for example, tasks, events, activities or other pieces of information, that have been entered either manually or automatically through information capture into the list authoring surface. For example, a first entry 220 of "Turn off sprinkler system" is illustrative of a task a user may enter into the list authoring surface user interface 120 to remind the user to handle this task when he returns home. For another example, a second entry 225 of "Redesign product" is illustrated having a number of subtasks 230 associated with the main task 225. Items displayed in the LAS UI 120 may be displayed according to one or more specified display arrangements, for example, based on designated time of performance, most recent on top, top 5 items as designated by a user, and the like. Such display arrangements may also apply to pivoted displays as described below with reference to FIG. 3.

Advantageously, entering and editing information into the list authoring surface UI 120 is easy and efficient. For example, information may be typed into the UI in a similar manner as entering a bulleted list of items in a word processing document. That is, the user may enter an item, select the "enter" key, "tab" key, or the like, and subsequent entries will be placed in the next row or sentence in the UI 120, but still have all of the benefits of any applied metadata. For example, the LAS UI may be formatted such that a simple carriage return or tab selection may create a hierarchy in entered list items that may be beneficial to the user. For example, the user may enter a first task of "Plan dinner party," followed by a carriage return or tab and then the entry of "Reserve restaurant," followed by another carriage return and the entry "Review menu offerings." By applying a hierarchical formatting to the entered items, the second two items may automatically be listed beneath and indented relative to the first item to create a displayed hierarchical relationship between the items.

According to embodiments, once data or other information is populated into the list authoring surface UI 120, metadata, for example, the phrase "@Team" 235, 240 may be entered into the LAS UI 120 as one or more text entries and may be applied to key words, key terms, key phrases, or other information components of a task list item to allow for structuring, editing, filtering, searching, sorting, or other automated manipulation of task list items (i.e., tasks, text or information) contained in the UI 120. Alternatively, metadata items may be selected from a menu of metadata items for application. For example, the metadata "@Team" may be applied to the task "Meet with Contoso's team and evaluate areas in which they could support us" to indicate that the example task is one of one or more tasks to be completed by a given team. In contrast, the metadata "@EricGruber" is applied to a task of "Setting up meeting for next review" to indicate that task is associated with a particular person.

Many other types of metadata may be applied to information in the list authoring surface UI 120. For example, while the example "@" symbol is used above to associate a task with a person or group, the "#" symbol may be used for tagging a task or other information with random metadata. For other examples, the "$" could be used to tag monetary information, the "&" symbol could be used to tag dates or time. As should be appreciated, any of a great number of such metadata types and symbols could be used, and the foregoing are for purposes of example only. Advantageously, such metadata items may be associated with information in the list authoring surface UI without entering another text or data entry field or without launching any other user interface component. As also should be appreciated, such metadata applied to various information in the list authoring surface UI 120 will allow for sorting, searching, filtering or otherwise manipulating the information contained in the UI 120. For example, using the metadata "@Team" may allow a sorting on all tasks, events, or other pieces of information to be performed by or that are associated with the team of personnel associated with the metadata "@Team."

In addition to using applied metadata to allow manipulation of information in the list authoring surface UI 120, applied metadata may also be used to add or manipulate data in other list authoring surface UIs of other users. For example, if a first user enters or captures a given piece of information in her list authoring surface UI, and then applies a metadata item such as "@Sarah" to the information, according to an embodiment, "Sarah" may now have the tagged information automatically populated into her list authoring surface UI so that she sees the tagged information as well.

As should be appreciated, an almost limitless amount and type of metadata may be applied to various pieces of information entered in the list authoring surface. For example, such metadata terms as date, time, location, name, address, telephone number, alphanumeric, audio, video and the like may be applied to one or more words, phrases, data, files, and the like for allowing future editing, sorting, searching, or manipulation of the information contained in the list authoring surface. For example, if a metadata type of "date" is applied to all dates contained in the list authoring surface UI 120, such metadata may be utilized for tagging dates contained in the UI 120 to allow a user to filter, sort, or search data contained in the UI 120 based on date. For example, a user may desire to sort all information contained in the UI 120 by date to allow the user to quickly see those tasks or events that are occurring or that should be performed today.

In addition to the application of metadata to one or more words, phrases or other pieces of information, natural language processing may be utilized for tagging and/or applying metadata to information contained in the list authoring surface. For example, if a phrase such as "Meet at Bob's Pizza Parlor at 6:00 p.m. on Friday" is entered into the list authoring surface user interface 120 a natural language processor may be applied to the phrase to parse the words to determine whether any of the words are associated with a particular information or data type. For example, each word or combination of the words in the example task item may be parsed to determine whether any particular information type is involved. For example, the words "Bob's Pizza Parlor" may be tagged as a name of a business, the time "6:00 p.m." may be tagged as a time, and the day "Friday" may be tagged as a particular day. A natural language processor may parse such phrases into one or more words, and the one or more words may be used for searching dictionaries or stores of words for matching the parsed words with various known words such as restaurant names, times, days, and the like. Once the natural language processor identifies certain words or phrases as belonging to information types, those words or phrases may be tagged with metadata so that the words or phrases may be utilized for searching, sorting, filtering editing or otherwise manipulating the information, as described above.

In addition to such manipulation of listed information, allowing for acting on the listed information is equally important. For example, functionality buttons and controls may be exposed in the list authoring surface UI to allow actions on listed items. For example, the listing of a contact item, such as "Bob's Pizza Parlor" may cause the listing of a "call" button which when selected causes a telephone program to call the listed contact, or an "email," "text" or similar button which when selected may allow an email or text message to be sent to the contact, etc. As should be appreciated, many other types of action controls may be exposed for listed items. For example, a control for adding listed names and related information to a contacts folder may be exposed, and the like.

In addition to natural language processing, other methods for recognizing and utilizing particular pieces of information may be used. For example, other methods may include, parsing text or data and passing the parsed text or data to one or more recognizer modules. Still other methods may include use of data analytics to analyze all of the data on the server and show auto-complete or other information (e.g., everyone who enters "Christmas" also happens to tag it with "#holiday" and perhaps you the user would like to as well). In addition, search may be used, for example, entering "Bob's Pizza Parlor" would cause a detection/identification by doing a search and seeing that "Bob's Pizza Parlor" is actually a restaurant that has an associated URL such as www.bobspizzaparlor.com.

According to embodiments, in addition to metadata tags, other list item attributes, including other forms of metadata, may be applied to list items entered into the list authoring surface. For example, list item attributes, such as team attribute, person attribute, date attribute, time attribute, location attribute, name attribute, address attribute, telephone number attribute, alphanumeric attribute, audio attribute, video attribute, and the like may be applied to a given list item. As should be appreciated, the list item attributes may be extensible and customizable, for example, price attributes, location in a store of items on a purchase list, etc. For example, a list item of "@Team1Meet at 2:00 pm to discuss project" may be additionally annotated with a list item attribute of a person's name, such as "Joe," to create a modified list item of "@Team1Meet at Joe's office at 2:00 pm to discuss project." The list authoring surface may then associate the first metadata item of "@Team" with the list item attributes of "2:00 pm" and/or "Joe's office" to generate a task for display in the list user interface 120 of all users who are members of "@Team1.". Association of such metadata items and list item attributes may allow the task to be used more effectively. For example, the resulting task item, may allow the list authoring surface to retrieve information about the members of "Team1," for example, calendaring information to determine whether the members are available at "2:00 pm," and/or the list authoring surface may retrieve contact information to determine the location of "Joe's office." Such information may be automatically added to the list authoring surface 120 as a pivot item out from the resulting task. As should be appreciated, these are only examples of the many ways in which metadata items and other list item attributes may be associated to enhance the effectiveness of task items in the list authoring surface.

Information entered into the list authoring surface UI 120 and tagged or grouped according to one or more metadata types, list item attributes or in association with a natural language processor, as described above, may then be utilized in a variety of helpful ways, including generation and display of resulting tasks. For example, date and/or time annotation or tagging applied to tasks, events, activities or other pieces of information (hereafter referred to as "tasks") may be utilized for manipulating, e.g., editing, sorting, searching, or otherwise manipulating, tasks and related information contained in the list authoring surface according to any applied metadata or list item attributes, e.g., date/time, people, teams, etc. In addition, tasks annotated with a date and/or time metadata may be organized in an events timeline and may be further annotated to help the user accomplish or otherwise handle tasks along a prescribed timeline. As referred to herein, timeline may be broadly defined to include any time representation, including dates, times, calendar information, seasons, years, etc. For example, certain tasks may have hard deadlines, for example, a doctor's appointment on a specific date and time that may not be moved by the user.

Other tasks may require accomplishment or handling during a prescribed date/time range, for example, some time on Friday before 6:00 p.m. According to embodiments of the invention, such date and/or timing information may be applied to tasks entered into the list authoring surface user interface 120 to apply a "fuzziness" to the timing aspect of tasks contained in the user interface. For example, if on a given day two tasks must be accomplished or otherwise handled at very specific times, then those tasks may be annotated with metadata allowing the user to sort, search or otherwise manipulate those items based on the hard dates/times applied. On the other hand, if one or more other tasks must be completed on the same day, but may be completed at any time up to a given end time, for example, 6:00 p.m., then those tasks may be annotated with a metadata type allowing those items to move in the events timeline associated with tasks that must be accomplished or otherwise handled on the prescribed day so long as the times for accomplishing or otherwise handling those items do not go beyond a prescribed outer time limit, for example, 6:00 p.m. For another example, if a user wants to mow his/her lawn in the morning and go to a specific restaurant that evening, the list authoring surface may allow capturing times like "Morning" and "Evening" in the same way that using a paper calendar they may put the mowing activity towards the top of the box for that day and the restaurant name towards the bottom of the box for that day without a specific time for either. According to an embodiment, then, sorting, searching or otherwise manipulating list items contained in the list authoring surface UI 120 may be accomplished on list items having hard date/times, or may be accomplished on list items having soft or fuzzy date/times, or a combination thereof.

The list authoring surface UI 120 may provide reminders to the user to accomplish or otherwise handle tasks contained in the list authoring surface UI 120, and the inclusion of metadata associated with hard dates/times and metadata associated with soft or fuzzy dates/times may be utilized for providing a more realistic experience to the user. For example, a reminder of an upcoming hard date/time, for example, a specific appointment, may be of one variety of reminder and a reminder associated with a soft or fuzzy date/time may be of a different type of reminder that is less urgent in comparison to a reminder associated with a hard date/time. In addition, tasks associated with a soft or fuzzy date/time may be automatically floated through a given day's schedule until a prescribed end point, for example, no later than 6:00 p.m. is approached. Thus, the reminders associated with hard date/time items as compared to soft or fuzzy date/time items may be accomplished in a way that more closely approximates how a user might remind himself or herself of such items by jotting the items down on a scrap of paper, notepad, sticky note, and the like.

As described in further detail below, the list authoring surface user interface 120 may be deployed in association with a multitude of software applications and data associated with different software application types. For example, the list authoring surface may be utilized for receiving information from or capturing information from a variety of electronic files, such as word processing documents, spreadsheet application documents, slide presentation application slides, Internet browser content, social media site content, video applications, audio applications, electronic inking, for example, handwriting electronically with a stylus and electronic writing pad, photographs, electronic mail items, calendar items, task items from other tasks, speech-to-text files, and the like. In addition, information stored for the list authoring surface may be utilized by other applications for enhancing the functionality of the list authoring surface.

Consider the example entered or captured task in the form of the phrase "Meet at Bob's Pizza Parlor at 6:00 p.m. on Friday." Once individual words or phrases in the entry are parsed, recognized, annotated, or otherwise tagged with metadata as described above, those tagged items may be utilized by other applications to enhance the functionality of the list authoring surface. For example, the business name of "Bob's Pizza Parlor" may be passed to a software application for determining a location of Bob's Pizza Parlor. The location of Bob's Pizza Parlor may in turn be passed to a global positioning system (GPS) mechanism of the user's global device, for example, a phone, personal digital assistant, etc., the time associated with the entry of "6:00 p.m. on Friday" may be passed to a calendar function utilized by the user, and any other words or phrases of interest in the phrase may be thus utilized. Now, following with this example, if the user leaves his or her office and is utilizing a mobile device, to which he has deployed the list authoring surface UI 120, as will be described below, as the user approaches the location of the example "Bob's Pizza Parlor" or as the user approaches the designated time of "6:00 p.m. on Friday," or a combination of the two, a reminder may be provided to the user via his mobile device that the time for meeting at "Bob's Pizza Parlor" is approaching, or that the location of "Bob's Pizza Parlor" is approaching, or of a combination of the above. Use of presence data (for example, location of a mobile device as determined by signal strength or GPS positioning) may also be used to relate information or task reminders in the list authoring surface to other pertinent information, such as calendar items, meeting locations, etc. In addition, if the meeting reminder is associated with a particular person or group of persons, the list authoring surface may query a contacts application for contacts information for the person or persons and make that information available through the list authoring surface UI 120.

For another example, if a user enters a task associated with the editing of a particular portion of a given word processing document, metadata associated with an identification of the particular document may be applied to the task entered into the list authoring surface user interface 120. When the user next opens the specified word processing document, a reminder may surface in the list authoring surface UI 120 to remind the user that a particular paragraph in the word processing document should be edited. According to one embodiment, if such a document is not already opened, if the user sees a reminder to edit an identified document, the document may be opened directly from the list authoring surface UI 120 by selecting the document identified in the UI 120.

Referring still to FIG. 2, one or more functionality buttons and controls may be exposed in the user interface 120, in addition to those described above with reference to FIG. 1. A reminder function 210 may allow a user to mark a given task or information item in the UI 120 for setting a desired reminder date/time. A private notification function 215 may allow a user to mark a given task or information item as "private" so that the task or information item is not exposed to other users via their list authoring surface user interfaces. As should be appreciated, the functions 210 and 215 are only examples of the many functions that may be exposed in the list authoring surface UI 120 for applying useful metadata or function to tasks or information items listed in the UI 120.

Figure 3:
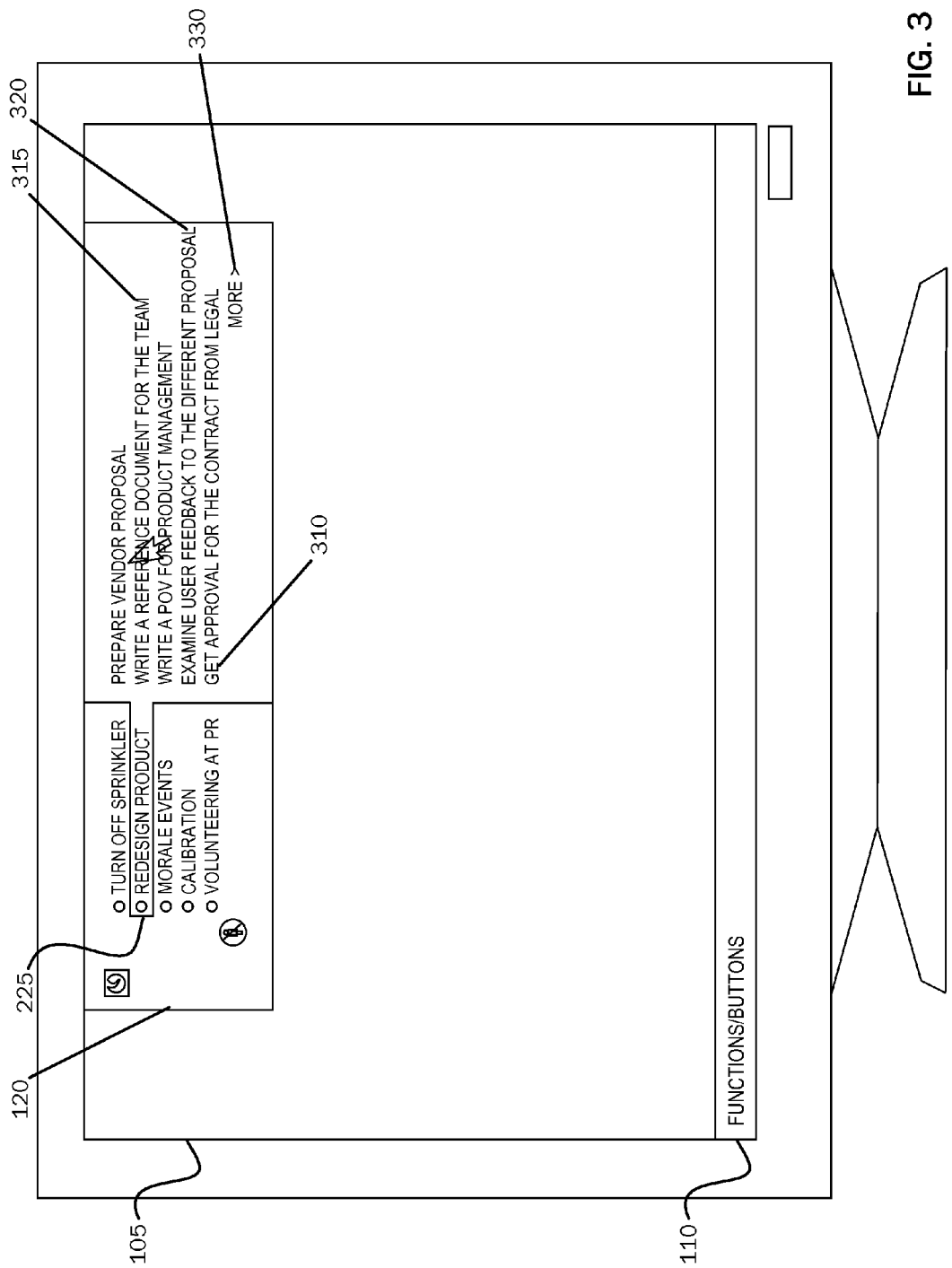
FIG. 3 is a simplified block diagram of the list authoring surface user interface of FIG. 2 showing a list of information pivoting out from a selected task item.

FIG. 3 is a simplified block diagram of the list authoring surface list user interface of FIG. 2 showing a list of information pivoting out from a selected task item. As should be appreciated, for any individual task or other piece of information entered into the list authoring surface, one or more subtasks, sub events, or sub items of information may be entered and associated with any previously entered tasks. For example, referring to FIG. 3 a variety of tasks or other pieces of information 315, 320, have been entered in association with a parent task 225 of "Redesign product." According to an embodiment, selection of the parent task 225 allows for the launching of a pivot table 310 within the list authoring surface user interface 120 for displaying the subtasks 315, 320 associated with the parent task 225. A "More" button 330 is illustrated for allowing a display of additional subtasks 315, 320 under the selected parent subtask 225 if the available size of the user interface 120 only provides for an initial display of a fixed number of tasks, events, activities or other pieces of information. According to one embodiment, a specified maximum number of displayed subtasks, for example five subtasks, may be displayed to keep the user's focus on a "top" number of important tasks. As should be appreciated, subtask information displayed in the pivot table 310 may be filtered, searched, sorted, or otherwise manipulated as is the case with information contained in the main user interface 120.

Figure 4:
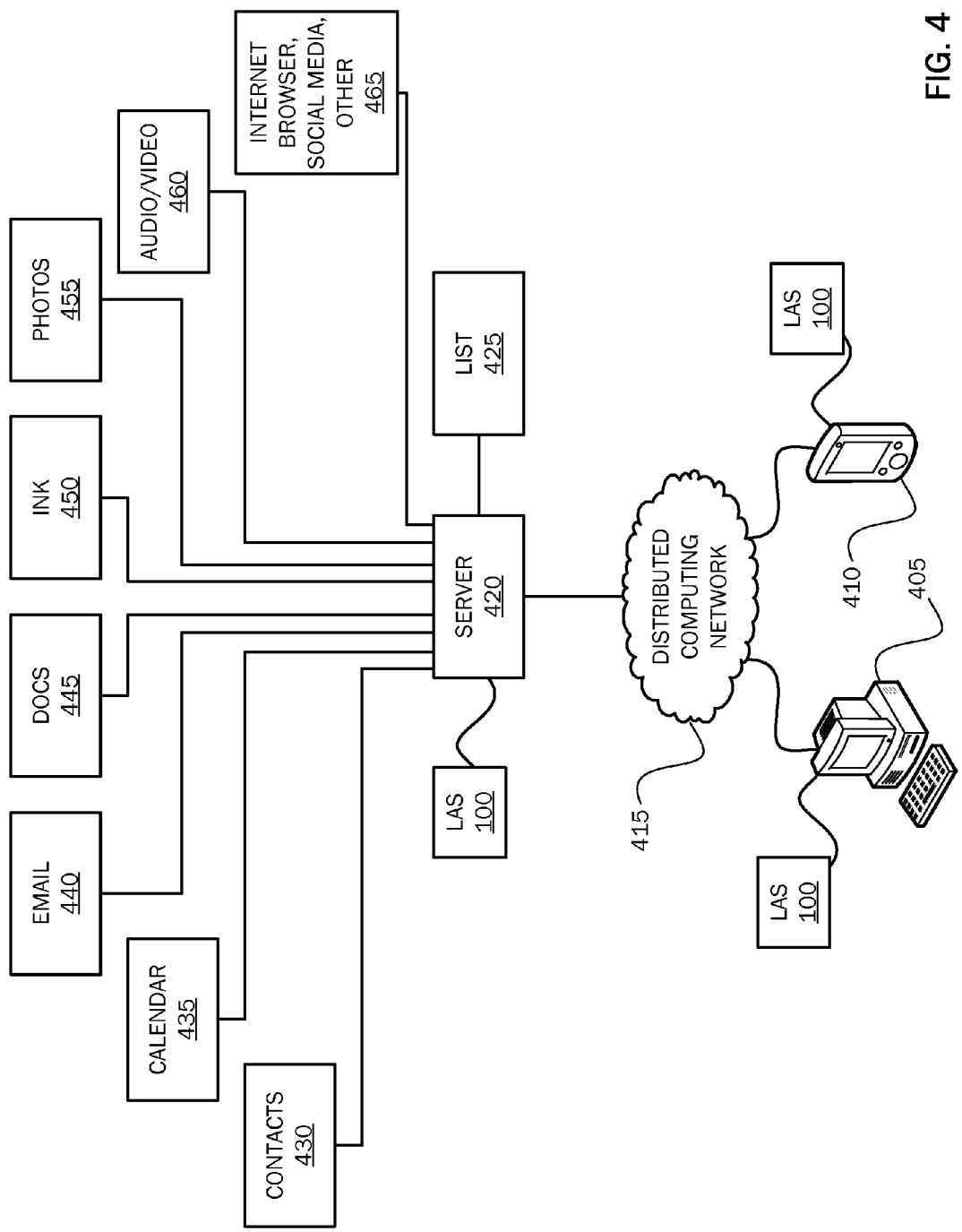
FIG. 4 is a simplified block diagram of a computing architecture in which embodiments of the present invention may be practiced.

FIG. 4 is a simplified block diagram of a computing architecture in which embodiments of the present invention may be practiced. Referring to FIG. 4, the desktop or laptop computer 405 is illustrative of any stationary computing device utilized by a user for entering, capturing or otherwise utilizing data in association with the list authoring surface described herein. The mobile device for 410 is illustrative of a mobile telephone, personal digital assistant, wirelessly connected laptop computer or any other computing device with which a user may utilize the list authoring surface in a mobile environment. The distributed computing network 415 is illustrative of any suitable means for allowing the computing devices 405, 410 to communicate with one or more applications or databases via a remote server 420, for example, the Internet, a corporate intranet, a home-based intranet, and the like.

The server 420 is illustrative of a general purpose computing device operating as a remote server on which the functionality of the list authoring surface may be maintained for allowing the list authoring surface to follow the user from one device 405 to another device 405 to a mobile device 410, or to any other device on which the list authoring surface UI 120 may be deployed for use as described herein. According to an embodiment, all functionality and data storage associated with the list authoring surface and the associated user interface 120 may take the form of a list authoring surface application or module 100 having sufficient computer-executable instructions for performing the functions described herein. The list authoring surface application or module 100 may be resident on a single computing device 405 or 410 for use in association with data accessible by the devices 405 and 410. Alternatively, the functionality and associated data for the list authoring surface and its associated user interface 120 may be maintained and operated at the remote server 420, as illustrated in FIG. 4.

The list 425 is illustrative of a database list or table accessible by the device 405 or 410 locally or via the server 420 where information entered manually or automatically into the list authoring surface and displayed via the associated user interface 420 is maintained. As should be appreciated, if the user is not in a distributed computing environment, the list 425 and associated stored data may be stored or cached on a local computing device 405, 410. That is, according to an embodiment, each instantiation of the list authoring surface may cause the generation of a list table 425 maintained in a database stored locally on the computing device 405, 410 or stored in association with the server 420.

In the list 425, each task, event, activity, or other piece of information may be assigned to and stored in a given line in the list 425. In addition to storing each individual entry, information identifying annotations applied to individual entries, for example, metadata, or other identifying information may be stored in the list 425 with the associated information entry. Moreover, if the information is associated with other data, for example, a document, calendar item, electronic mail entry, or if an entry is associated with other information, for example, global positioning system location data, date/time data, and the like, information identifying such associations may also be stored on a line in the list 425 or linked to a different list 425 with each associated task, event, activity or other piece of information entered manually or automatically into the list authoring surface. As new data is added to the list authoring surface user interface, or as data is changed in the list authoring surface, or as data contained in the list authoring surface is associated with other information, the data stored in list 425 is updated. According to alternative embodiments, the list items 425 and associated data may be stored according to a variety of different means aside from a data base line described above. For example, the list items and associated data may be stored as extensible markup language (XML) representations or similar representations across multiple linked lists, tables and the like that are available to or accessible by the list authoring surface.

Referring still to FIG. 4, a variety of information sources available to the list authoring surface are illustrated. For example, information from a contacts application or database 430 may be utilized for obtaining information for entry into the list authoring surface. Information from a calendaring application 435 and associated data storage may similarly be obtained. As will be described below with reference to FIG. 6, information from an electronic mail application and associated content 440 may be utilized for populating the list authoring surface. Information from a variety of documents 445, for example, word processing documents, slide presentation documents, spreadsheet application documents, and the like may be utilized for population of data into the list authoring surface. An ink application 450 is illustrative of an electronic pen and ink application for allowing data entry, for example, through contact of a stylus with an electronic writing pad. Photos applications/storage 455 is illustrative of any application or data storage through which photographs may be obtained and copied or moved to the list authoring surface. The audio/video application and storage 460 is illustrative of one or more means for obtaining audio or video files, for example, a recording mechanism operated through a digital or analog recording device or camera such as might be available through a mobile telephone and the like. Content for the list authoring surface may also come from Internet browsers, social media sites, or other sources 465. As should be appreciated, data and information from any other available source for electronically moving or copying or otherwise entering data may be utilized for populating the list authoring surface and its associated user interface 120 with tasks, events or other information of interest.

While the various data or information illustrated in FIG. 4 are illustrated in association with the server 420, each of these sources of data and/or information may also be directly associated with and/or stored at local computing devices 405, 410.

In addition, according to embodiments, information from one or more sources to the list authoring surface is not a one-way communication. That is, according to embodiments, the list authoring surface and/or individual task lists or task list items may be linked to the source from which task list items were obtained (e.g., a word processing document), and information from the task list may be pushed back to the source. For example, if a piece of information in the form of a task item is in the LAS UI 120, that information may be pushed back to a source from which it came. As should be appreciated, a variety of mechanisms may be utilized for pushing information back to the source. A path to the source may be associated with each respective task list item. A selection of the task list item may cause exposure in the LAS UI 120 of a selectable button or control for pushing the selected item back to the source and/or for launching the source document.

Figure 5:
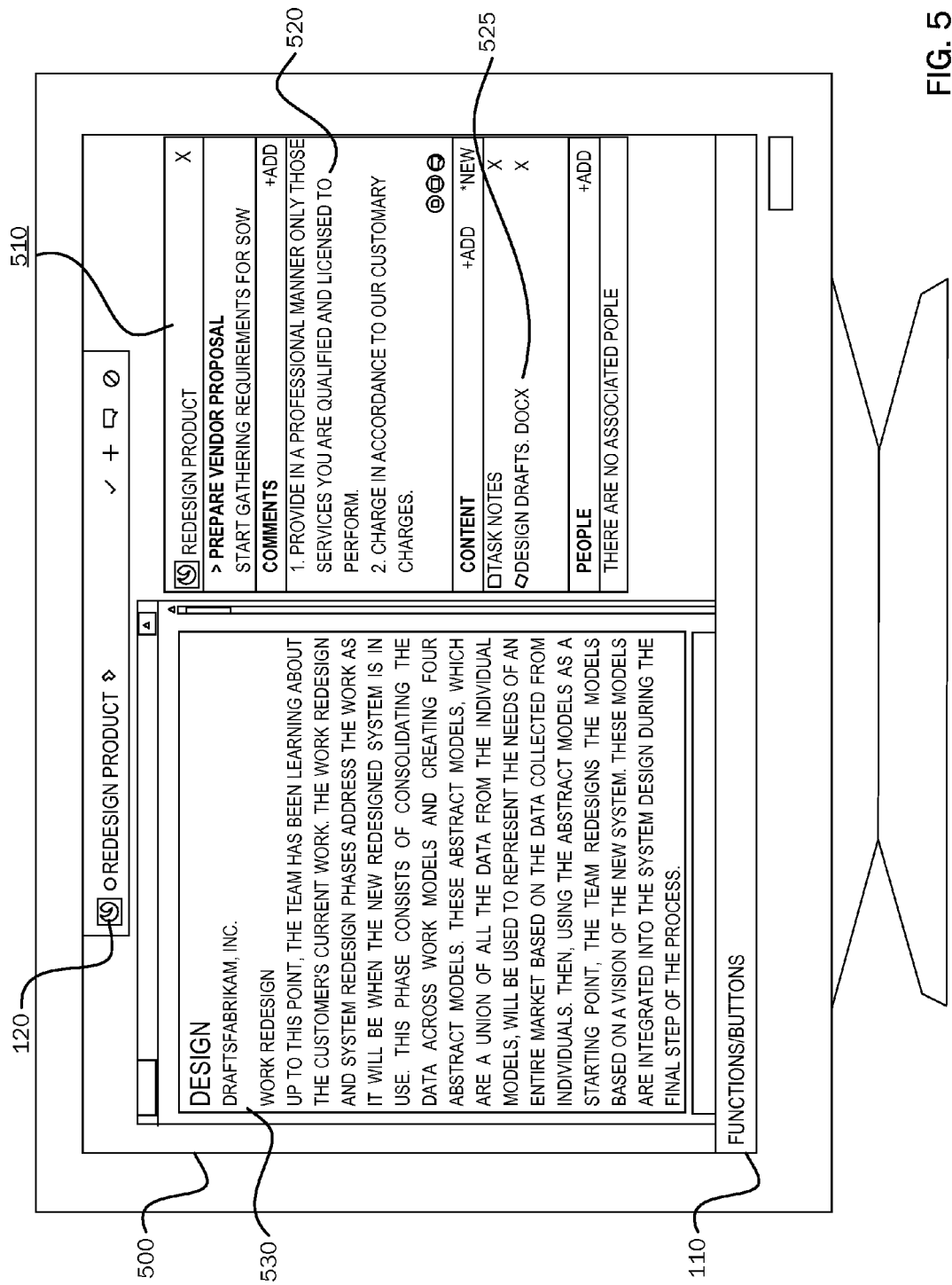
FIG. 5 is a simplified block diagram illustrating a list authoring surface user interface displayed in association with a displayed document.

FIG. 5 is a simplified block diagram illustrating a list authoring surface interface and a list authoring surface information input component in association with a displayed document. As described above, information may be entered into the list authoring surface user interface 120 manually or automatically through information capture as described below. As illustrated in FIG. 5, an example document 530 is illustrated displayed on the computer monitor display screen 500 in association with an example word processing application. According to embodiments of the invention, an expanded version of the list authoring service user interface 120 may be deployed as illustrated and described above with respect to FIGS. 2 and 3 for entering any desired information including information about or associated with a displayed document 530.

According to another embodiment, a list authoring surface information input component 510 may be deployed in association with the list authoring surface user interface 120 for entering and annotating data about a given task or information item in the list authoring surface UI 120. According to the example illustrated in FIG. 5, the list authoring surface information input component 510 has been launched in association with the task "Redesign product" and displayed in the list authoring surface UI 120. The list authoring surface information input component 510 includes a title section for providing data to identify the information being entered in association with a given task, event or other piece of information included in the list authoring surface. For example, the list authoring surface information input component 510, illustrated in FIG. 5, is identified in association with the task of "Prepare vendor proposal" which is a subtask of the parent task "Redesign product." Underneath the title portion of the list authoring surface information input component 510 is a comment section 520 for allowing a user to enter comments which may be additional tasks, events, activities or other information associated with the example subtask. For example, the comments entered in the comments section 520 may be subtasks to the subtask "Prepare vendor proposal," or the comments entered in the comments section 520 may simply be comments to remind the user of various aspects of the associated subtask.

A content section 525 is provided for allowing other content items, for example, documents, audio files, video files, or other content types to be associated with the example task or subtask. A "people" section is illustrated at the bottom of the list authoring surface information input component 510 for associating one or more people, groups of people or teams with the subtask. For example, as was described and illustrated above with respect to FIG. 2, a team grouping that may be utilized in association with a metadata tag of "@Team" may be applied to a given task or subtask. Other groupings or individual persons may similarly be associated with one or more tasks or subtasks entered into the list authoring surface and its associated UI 120. As should be appreciated, the configuration, layout and fields illustrated in the list authoring surface information input component 510 are for purposes of example only and are not limiting of other text, data entry or data annotating fields or sections that may be provided in the list authoring surface information input component 510.

Referring still to FIG. 5, the document 530 displayed on the display screen 500 is illustrative of any document, such as a word processing document, spreadsheet document, slide presentation document, notes document, tasks document, calendaring document, and the like that may be displayed on the display screen 500. As is illustrated in FIG. 5, the document 530 is being processed in some manner by a user, and the user decides to enter information into the list authoring surface via the list authoring surface information input component 510 about the displayed document. For example, as the user is editing the displayed document, the user may remember that one or more tasks should be performed in association with the project referenced in the displayed document. Thus, by launching the list authoring surface user interface 120 and subsequently launching the list authoring surface information input component 510, the user may insert tasks, comments, content items or associate the document or portions of the document or tasks associated with the document with one or more people, groups or teams of people just as the user might handwrite such notes or annotations on a scrap of paper or sticky note to remind the user subsequently to deal with those matters. According to an alternate embodiment, entering tasks or other information into the LAS UI 120 while a document 530 is opened may cause tasks or other information entered into the UI 120 to be automatically associated with the document (i.e., metadata representing the document may be applied to the entered tasks or other information).

As illustrated and described above with reference to FIG. 4, the list authoring surface and its associated user interface 120 may be utilized in a stationary computing system 405, or the list authoring surface may be utilized in association with one or more mobile devices 410. Advantageously, information stored in the list authoring surface in the list 425 in association with the server 420 may be deployed across a variety of applications, as described herein, and may be deployed on a user's mobile device when the user is on the go. Thus, the list authoring surface allows the user to, in effect, carry an electronic version of a "To do" list when the user leaves the desktop operating environment by having the list authoring surface and its associated user interface 120 deployed on his or her mobile computing device, such as a mobile telephone, personal digital assistant, wireless gaming device, and the like.

According to embodiments, the list user interface may be imported to the stationary computing device 405 and to the mobile computing device 410 from the remote server 420. When tasks are displayed in the list user interface, an instantiation of the list user interface may be displayed on the stationary computing device and on the mobile computing device. When changes are made to tasks in the list user interface at the remote server, the changes are passed to the stationary and mobile devices in the form of new instantiations of the list user interface displayed on the stationary computing device and on the mobile computing device. In addition, when changes are made to tasks in the list authoring surface UI 120 at either the stationary or mobile computing devices, such changes may be passed up to the list authoring surface and associated data storage at the remote server 420.

Figure 6:
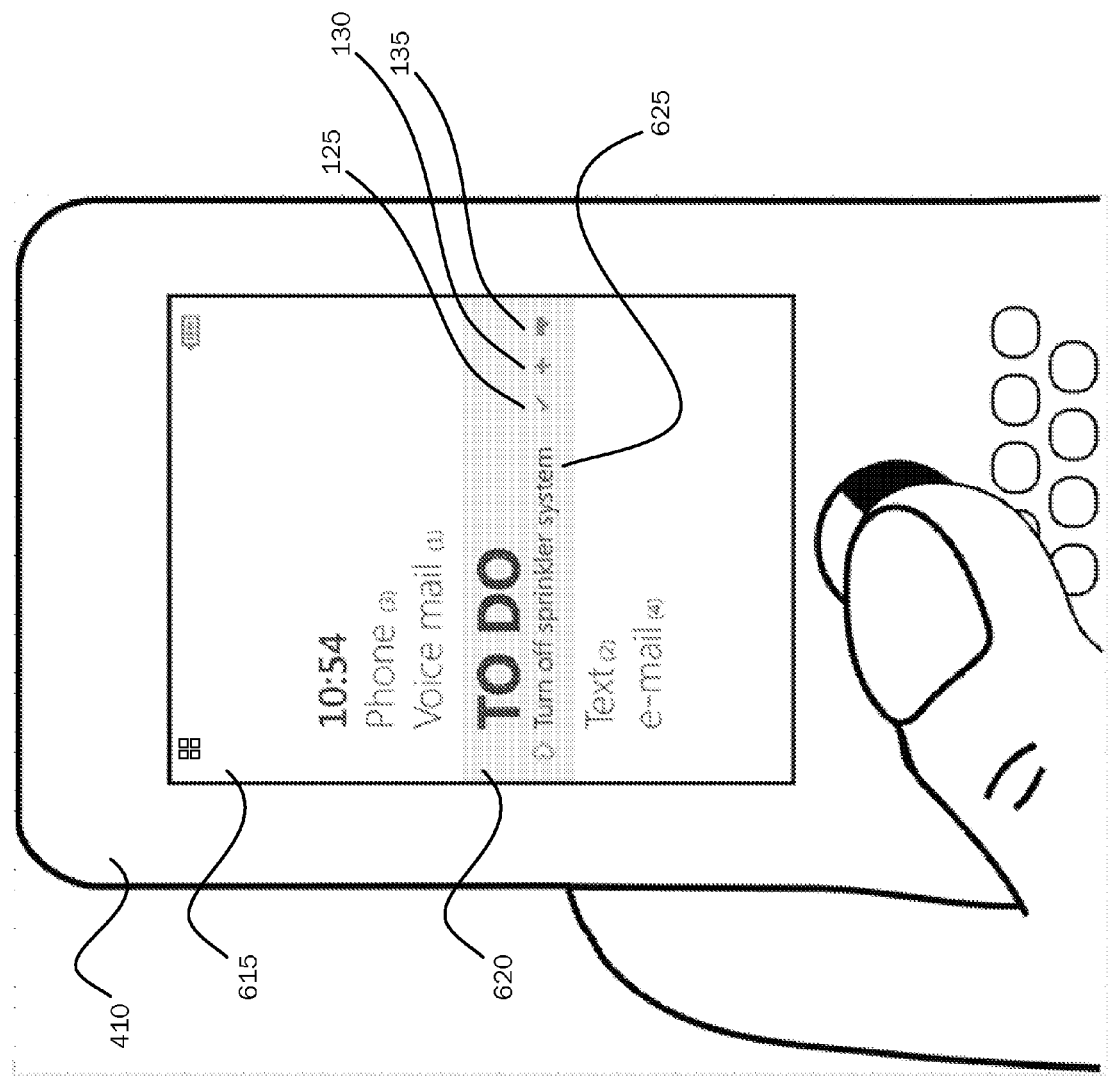
FIG. 6 is a simplified block diagram illustrating a mobile computing device and illustrating a list authoring surface user interface deployed on a display screen of the mobile computing device.
Figure 7:
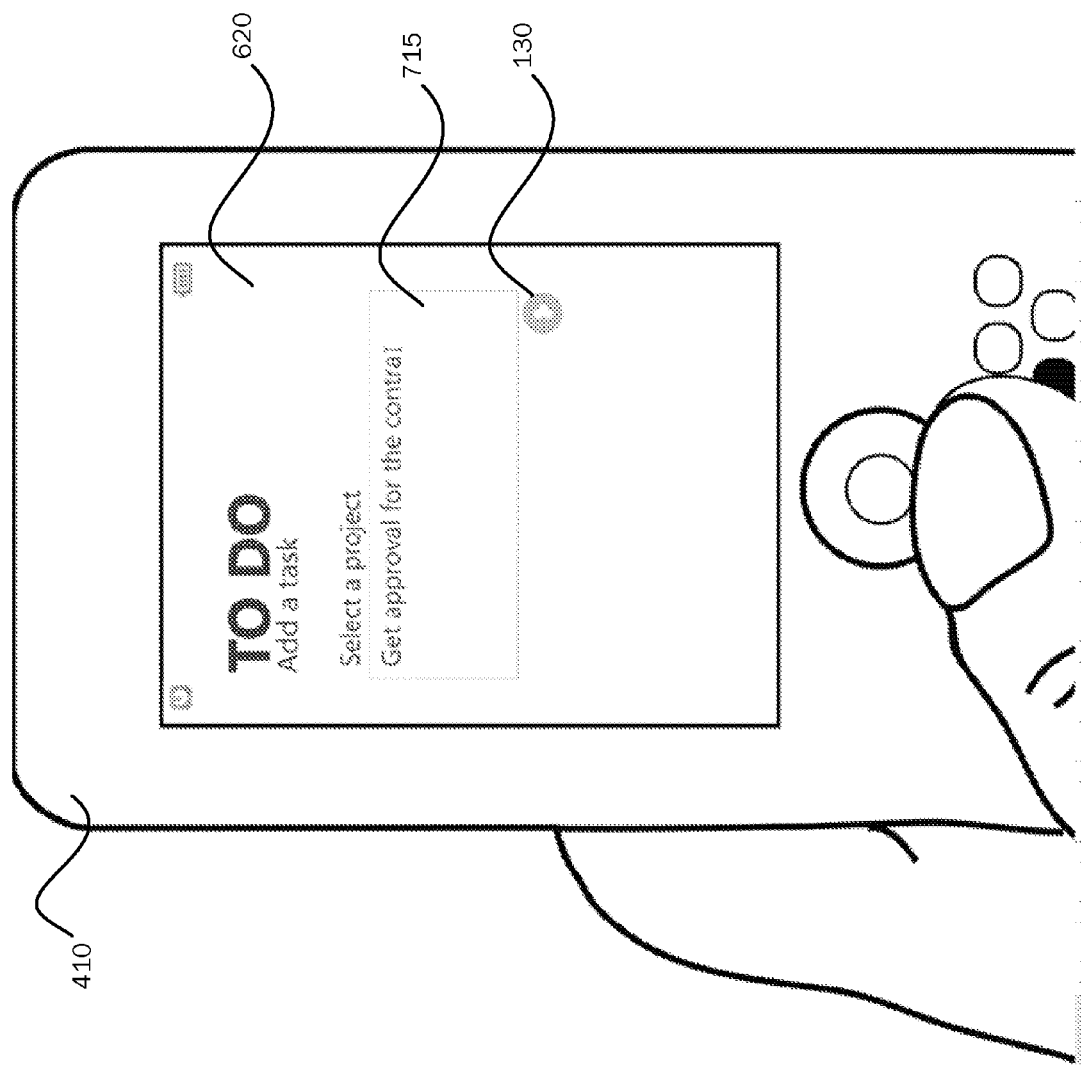
FIG. 7 is a simplified block diagram illustrating a mobile computing device and illustrating a list authoring surface user interface deployed on a display screen of the mobile computing device.

FIGS. 6 and 7 illustrate use of the list authoring surface and its associated user interface in a mobile environment. As illustrated in FIG. 6, the list authoring surface user interface 620 is illustrative of a mobile version of the list authoring surface UI 120, described above, deployed on the display screen 615 of a mobile telephone 410. Just as the user may deploy the list authoring surface user interface 120 on a display screen of his or her computer or laptop, as described above, with reference to FIGS. 1 through 7, so can the user deploy the list authoring surface user interface 620 on his or her mobile device to utilize the same functionality as may be utilized in a stationary computing environment.

Referring to FIG. 7, if the user launches the list authoring surface user interface 620, illustrated in FIG. 6, the "To do" list 625 may be launched on the display screen of the user's mobile device to allow the user to review one or more tasks, events, activities or other information or to allow the user to enter additional information 715, edit existing information, or otherwise manipulate existing information. If the user does edit or otherwise manipulate information contained in the list authoring surface user interface via his or her mobile device, the modified information may be stored at the list 425 via the server 420, and the next time the user deploys the list authoring surface user interface 120 on his or her stationary computing device, those changes or modifications made to information contained therein via the user's mobile device will appear in the user interface 120 deployed with respect to one or more other applications in the user's stationary computing environment.

In addition, the mobile device 410 may be utilized for quick capture of information that may be exported directly to the list authoring surface, as described below. For example, a camera function of a mobile telephone may be utilized for taking a photograph that may be automatically imported to the list authoring surface. For another example, global positioning system (GPS) data from the mobile device 410 may be captured with respect to a particular location or address and may be imported to the list authoring surface.

As briefly described above, according to one embodiment, a personal assistant application may use tasks stored in the list authoring surface for searching for task performance assistance that may be provided to a user in association with one or more tasks. For example, if the user has a task of "prepare resume," the personal assistant application may parse the language of the task and use information components of the task, such as keywords (e.g., "resume"), key phrases, alphanumeric strings, etc. to obtain information associated with the task. If the personal assistant, using a search mechanism described below, locates a suggested "resume" template that may be used with a word processing application, then the personal assistant may automatically or after a suggestion/acceptance to/from the user launch a word processing application and the suggested template when the time for performing the task occurs or if the user selects the task or otherwise filters the task to the forefront for performance. For another example, for a task of "call Bob," the personal assistant may use natural language processing or other method for recognizing words or phrases to determine that a call should be placed to Bob. By searching for a telephone number for "Bob" in the user's contacts files or via a telephone directory system and by automatically activating a calling program available to the personal assistant application, the call may be made for the user. If desired third party providers of such task performance functionality may sell the functionality to the user as part of the offering by the personal assistant application 810.

According another embodiment, the personal assistant application may use tasks stored in the list authoring surface for searching for help content, advertising or other helpful information that may be provided to a user in association with one or more tasks. For example, if the user has a task of "pick up flowers after work", the personal assistant application of the present invention may parse the language of the task for one or more keywords, key phrases, alpha numeric items, etc. The keywords, key phrases, or alpha numeric entries may then be passed to a search mechanism, for example, an Internet-based search application for obtaining help content, advertising, or other helpful information that may be passed to the user in the form of a new or modified task or in the form of displayed help content. In addition to a search mechanism, the personal assistant my perform a comparison of a keyword to a list of known or predefined words, for example, "call," "email," "print," "create document," "pick up," "flowers," etc. That is, simple mappings of parsed words or phrases may be made against known words or phrases.

Following with the above example, if the task of "pick up flowers after work" is provided, information extracted from the task phrase by the personal assistant application may be utilized for searching for florists in the user's local area, for getting location or telephone information for such florists, for obtaining advertising information for such florists and the like. Thus, the personal assistant application enhances the usefulness of the tasks by providing contextual help information associated with the tasks. In addition to providing basic information, such as advertising information, an action mechanism may be provided as described above. For example, an application for allowing the user to order flowers electronically may be automatically launched for the user, and instead of an advertisement being information only, the advertisement could take the form of a functional tool with which the user could perform an action, such as the example ordering of flowers.

Figure 8:
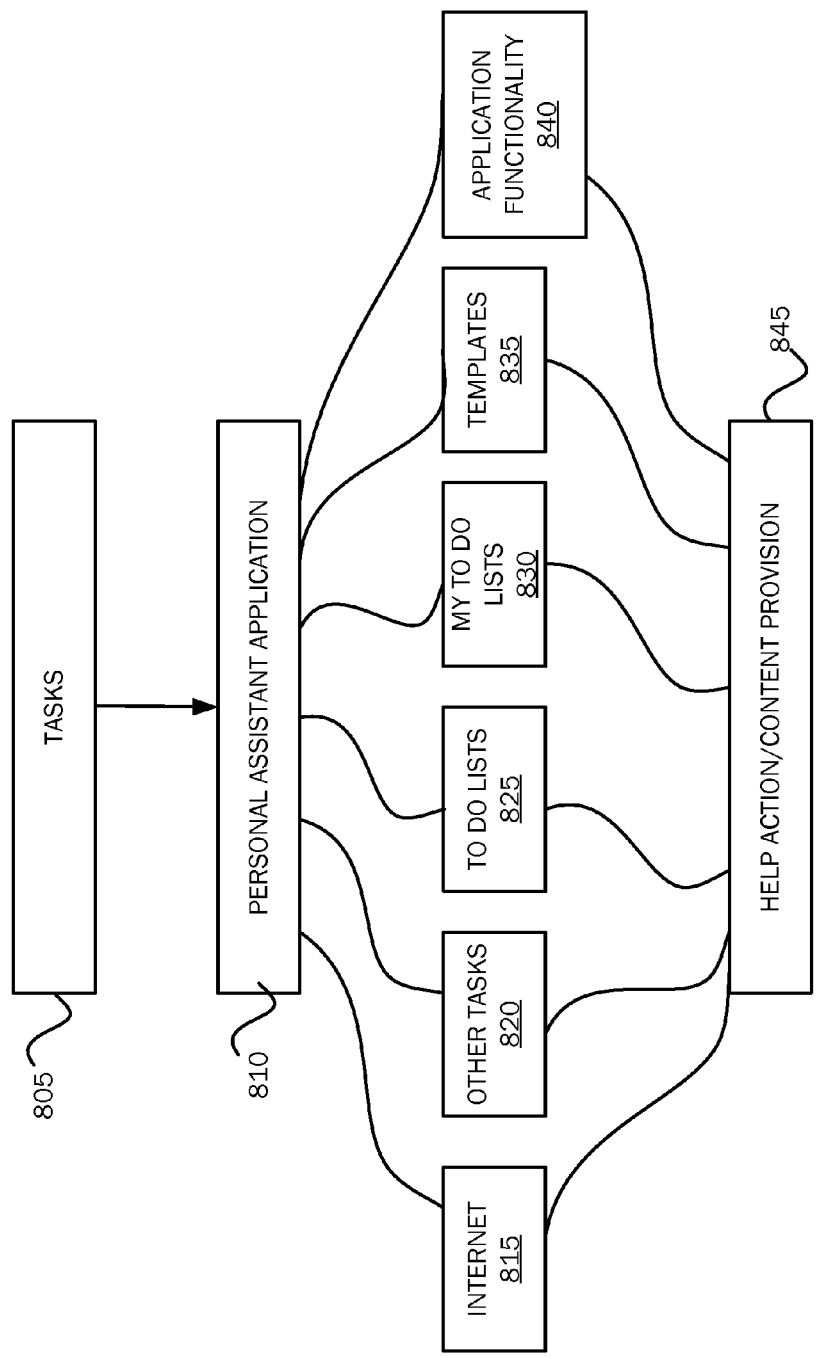
FIG. 8 is a simplified block diagram illustrating an architectural framework for a personal assistant application for obtaining help content in association with one or more tasks.

FIG. 8 is a simplified block diagram illustrating an architectural framework for a personal assistant application for obtaining help content in association with one or more tasks as described herein. In FIG. 8, the tasks 805 are illustrative of one or more tasks stored, entered, or generated for or on behalf of a user, such as the task list items contained in the list authoring surface as described above with respect to FIGS. 1 through 7. Alternatively, the tasks 805 may be electronic tasks entered or generated by or on behalf of the user through any other electronic calendar or tasks application operative to allow the generation, presentation, or other utilization of one or more electronic task items.

The personal assistant application 810 is a software application module operative to utilize one or more tasks 805 for conducting searches for task performance assistance and help content associated with one or more tasks in association with the help action/content provision module 845, described below. According to an embodiment, the personal assistant application 810 and the help action/content provision module 845 may operate as standalone application modules or as part of a larger application such as the list authoring surface 100.

According to one embodiment, the personal assistant application 810 may utilize natural language processing for parsing a task such as "pick up flowers after work" into one or more keywords, key terms, or key phrases that, in turn, may be utilized for searching help content sites, including Internet-based sites, application-based help content services, and the like. Alternatively, the personal assistant application 810 may utilize a recognition system wherein a phrase such as "pick up flowers after work" is parsed into individual words, and the individual words are compared against dictionaries or lists of words for recognition, as described above. Once a given word or phrase is recognized, for example, "call Bob," the recognized portion of the text, for example, "call" and "Bob" may be utilized for searching for help content, for example, a telephone number for "Bob" through a given help content source, and/or for providing performance assistance, for example, automatically activating a phone application to place the call for the user.

The information sources 815, 820, 825, 830, 835, 840 are illustrative of one or more source of information and functionality that may be utilized by the personal assistant application 810 for obtaining helpful information and task performance assistance associated with a given task. For example, words, terms or phrases parsed from given task by the personal assistant application 810 may be automatically entered into an Internet-based search engine, for example, BING manufactured by MICROSOFT CORPORATION, for searching for helpful information associated with a given task. For example, for the task of "pick up flowers after work," the personal assistant application 810 may use the word "flowers" and a known location for the user's computing device to enter a search string into an Internet-based search engine for obtaining advertisements, reviews, locations, hours of operation, or other information about one or more florists in the user's area. For another example, if the user is planning a complex social event, for example, a wedding, graduation party, and the like, keywords or phrases from an associated task may be utilized for conducting an Internet-based search for obtaining helpful information on how to organize and conduct such social events.

In addition to obtaining performance assistance functionality and help content based on the context of one or more tasks, assistance and help may also be obtained based on user preferences. That is, as part of the process of searching for performance assistance functionality and help content, the personal assistant application may also search a preference store or service for information about the user's preferences. Such an information store may include the list authoring surface and related data associated with previous or current tasks. For example, if the user has a task of "Buy toothpaste," the personal assistant application may search previous tasks, shopping lists and the like to determine that the user typically buys brand "ABC." Instead of searching for application functionality or help content associated with toothpaste in general, the personal assistant may return information about brand "ABC" and the personal assistant application 810 may provide functionality, for example, automatically ordering brand "ABC" for delivery to the user.

In addition to providing the helpful information, if performance of the task may be accomplished through some type of application functionality 840, then the helpful information may be combined with the appropriate application functionality 840 for automatic presentation to the user. For example, for the example planning of a complex social event, in addition to help content on how to plan such an event, a web based application for preparing invitations or for developing guest lists or for developing menus and the like may be automatically launched for the user in association with the task. In addition, a variety of local applications, such as word processing applications, slide presentation applications, spreadsheet applications, desktop publishing applications, and the like may be automatically launched by the personal assistant application for helping the user to perform the task.

Other tasks 820 may be utilized by the personal assistant application for comparing a parsed task with information contained or associated with other tasks for providing helpful information in the form of an association of a given task with other tasks. Other "To Do" lists 825 is illustrative of the "to do" lists or task lists of other users, wherein the personal assistant application 810 may gather information associated with other users' task lists for providing to the present user. For example, if another user utilizes a particular florist, and that information may be gleaned from the other user's task lists, then that information may be obtained and may be offered to the present user in association with the present user's task. In addition, "syndicated" "To Do" lists may be offered or sold by third parties, for example, specialized "To Do" lists for planning a wedding or building a house or best things to pack for a camping trip may be provided via the "To Do Lists" 825. The "My To Do" lists 830 is illustrative of a source of the present user's own to tasks that may be utilized for finding information that may be helpful to the user in association with a present task. For example, the user may have had a holiday gift card list in a "to do" list item he/she utilized six months ago. The personal assistant application 810 may find that holiday gift card list and offer that list to the user in association with a present task or otherwise use that information to modify the present task or to generate a new task, as described below.

The templates source 835 is illustrative of help information in the form of helpful templates or other help content that may be offered to a user in association with a parsed task. For one example, helpful templates may be in the form of "list templates" that could be copied or automatically imported into the LAS UI 120 to help the user build task lists (e.g., packing list template or building house template). That is, in response to the user entering a task if "Prepare packing list," the personal assistant application may find and import into the LAS UI 120 a template for building a packing list. For another example, if the user has a task 805 of "learn how to complete IRS tax Form 1040," keywords such as "Form 1040" may be utilized by the personal assistant application 810 for performing a search, for example, an Internet-based search of the Internal Revenue Service's help site, or such keywords may be entered into a help application for obtaining "how to" forms, templates, and the like.

As should be appreciated any of a variety of other help sources, including application-based help sources may be utilized by the personal assistant application. For example, if a user has a task of "Print resume before interview," a search for help content and functionality may cause the personal assistant application to surface a "Do it now" button or control (or similar functional command feature) in the list authoring surface UI 120 which would cause the personal assistant application to parse the text and actually print the resume (for example, it could search the user's hard drive for the most recently edited document named "resume" and then print it).

The application functionality 840 is illustrative of any application functionality available either locally or remotely to the personal assistant application 810 for automatically providing functionality as described herein. As should be appreciated the help content sources and functionality illustrated in FIG. 8 are for purposes of example and are not limiting of the vast numbers and types of help content sources or information sources and functionality sources that may be queried by the personal assistant application 810 for assisting the user in association with one or more tasks, as described herein.

The action/help content provision module 845 is illustrative of a software application module or component of the personal assistant application 810 for supplying the obtained action (performance assistance) or help content to the user. According to one embodiment, the module may provide the helpful actions, such a launching an application functionality, placing a call, etc. as described above, or the module may cause the provision of help content as described above. According to another embodiment, the personal assistant application 810 via the module 840 may utilize the obtained information to modify an existing task. For example, an existing task of "pick up flowers after work" may be modified by the personal assistant application to "Pick up flowers after work at ABC Florist on Fourth and Main Streets." Or, the task may be modified to provide a link to the help content. For example, a link to the ABC Florist Company may be provided in line with the associated task to allow the user to select or click on the link to obtain advertising information about the florist, location information, contact information, and the like. Or, the associated task may be modified to provide an advertisement, or other help information in line with the task, and/or the additional information may be displayed in the user interface 120 along with the task. Alternatively, the helpful information may be provided in a pivot table or drop down or fly out menu provided in response to selection of the task from the user interface 120. Or, according to one embodiment, the personal assistant application 810 via the module 840 could completely perform the task, for example, finding and printing a document in association with the task "print document."

In addition to modifying a given task, the personal assistant application 810, in association with the list authoring surface, may generate a new task altogether. For example, if a given task of "learn how to operate the print function of my word processing application" is used to obtain help content about the operations of the user's word processing application, a new task of "review operating procedures for your word processing application" may be generated and may be populated into the list authoring surface and into the associated list authoring surface user interface 120. As described above, in association with such a task, a template for building a list of subtasks for the main task may also be provided.

According to one embodiment, information from a task or from help content obtained by the personal assistant application 810 may be processed by one or more helpful applications or services to further assist the user. For example, addresses, telephone numbers, and the like gathered in association with help content may be passed to a location system, for example, a GPS system, for obtaining directions to a business or other facility or entity that is responsive or associated with the help content.

Provision of help content as described above may be done automatically by the personal assistant application 810, or the help content may be provided as a suggestion to the user, and the suggestion may be accepted or rejected by the user. If the user accepts the suggested help content, then the aforementioned help content, including modification of existing tasks, generation of new tasks or simple provision of help content, may be performed. If the user rejects the suggested help content, then the parsed task will remain unchanged.

Figure 9:
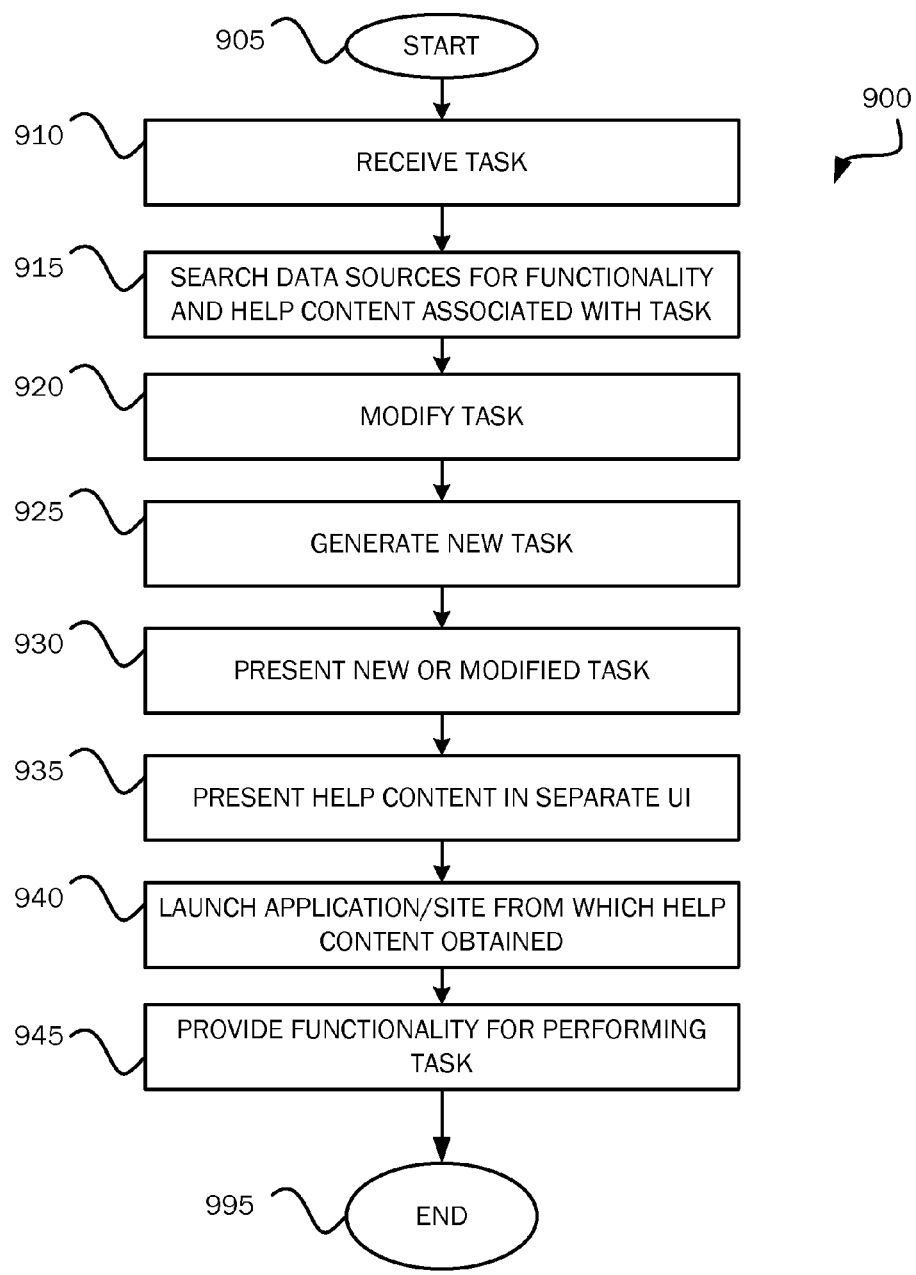
FIG. 9 is a flowchart illustrating a method for providing help content in association with one or more tasks.

Having described features and operating environments of/for embodiments of the invention, FIG. 9 is a flowchart illustrating a method for providing performance assistance and help content in association with one or more tasks. The operation 900 begins a start operation 905 and proceeds to operation 910 where a first task is received by the personal assistant application 810. That is, the personal assistant application 810 may pull a task from the list authoring surface user interface 120, for example, the top task on the task list, or from other any tasks application in use by the user, or the personal assistant application 810 may pull all tasks included in one or more task lists for reviewing one or more of the tasks, as described herein. The personal assistant application also may receive the first task in response to a selection of the first task by a user. In addition, the first electronic task may be received based on a reminder to perform the first electronic task.

For each received task, the personal assistant application 810 parses the task into one or more keywords, key terms, or key phrases through natural language processing or through another recognition means, as described above. At operation 915, keywords, key terms, key phrases are utilized by the personal assistant application 810 for searching one or more available data sources for performance assistance (e.g., application functionality) and help content associated with a given task. The one or more data sources may include searching one of an Internet-based search engine, an application-based help source, a templates source, an electronic calendar, an electronic tasks source, an electronic "to do" list, an electronic "my to do list," an application store, concierge service, human assistant service, or any other source that may be searched using a text string of the task or keywords, key terms, key phrases parsed from the text string.

In response to the search, help content may be returned for including in the task as a modified task or for generating a new task, as described below. Help content may be in the form of (but not limited to) Internet-displayed content, application-based help content, templates source content, electronic calendar content, electronic tasks content, electronic "to do" list content, electronic "my to do" list content and helpful coupons or other product/services offerings.

At operation 920, the personal assistant application 810 may modify an existing task by adding help content to the existing task, by adding a link to the help content to the existing task, by adding other content such as photographs, audio files, video files, electronic document files, and the like to a given task to modify the task from its original condition in order to allow the user to receive the help content when reviewing or following up on the given task. At operation 925, the personal assistant application 810 may generate a new task altogether if help content is of a type requiring or suggesting the need for a new task. As described above, modifications to existing tasks or generation of news tasks may be performed automatically by the personal assistant application 810 or modifications of existing tasks or generation of new tasks may be performed after a suggestion and subsequent acceptance of the modifications or new task generations to the user by the personal assistant application 810.

At operation 930, the modified or new tasks, in association with the obtained help content, may be presented to the user in the list authoring surface user interface 120, or in another tasks application in use by the user. At operation 935, as an alternative to presenting a modified or new task, the help content may be presented to the user in a separate user interface component on the user's desktop or mobile computing device. At operation 940, if desired, an application or site, for example, an Internet-based content site, from which help content was obtained may be launched. For example, if a link to a particular application or help content site is included in a modified or new task, the link may be selected by the user for launching or browsing to the associated application or site.

At operation 945, any obtained performance assistance functionality may be automatically provided or may be provided in response to a suggestion and acceptance to/from the user. For example, in association with a task of "Prepare a resume," a desktop publishing application and a resume template may be automatically launched for use, or the personal assistant application may suggest the functionality to the user and then may provide the functionality if user accepts the suggested functionality. The method ends at operation 995.

Figure 10:
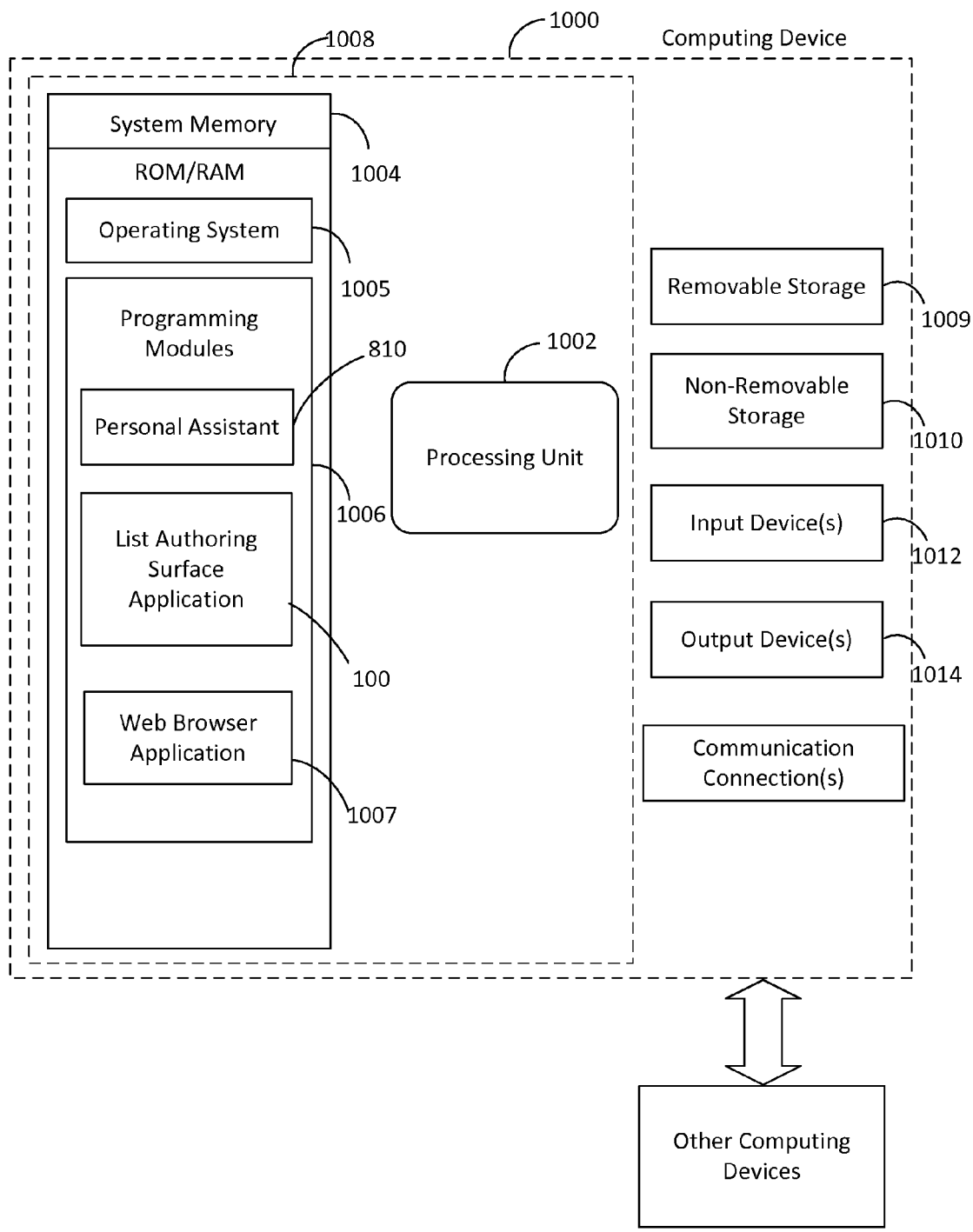
FIG. 10 is a simplified block diagram of a computing system in which embodiments of the invention may be practiced.

Having described embodiments of the present invention and an example logical flow illustrating a method for using task information to obtain help content, FIG. 10 is a block diagram illustrating example physical components of a computing device 1000 with which embodiments of the invention may be practiced. The computing device components described below may be suitable for the computing devices described above, for example, the computing devices 405, 410 and the server and database systems 420, 425. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a web browser application 1007. Operating system 1005, for example, may be suitable for controlling computing device 1000's operation. Furthermore, embodiments of the invention may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

As stated above, a number of program modules and data files may be stored in system memory 1004, including operating system 1005. While executing on processing unit 1002, programming modules 1006, such as the list authoring surface application or module 100, described above with respect to FIG. 1, and the personal assistant application 810, described above with respect to FIG. 8, and the web browser application 1007 may perform processes including, for example, one or more method 1000's stages as described above. The aforementioned process is an example, and processing unit 1002 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. In a computer system, a method performed by a processor for providing assistance in association with an electronic task, comprising:
    receiving a first electronic task;
    in response to receiving the first electronic task, performing the following operations:
        parsing a text string of the first electronic task for one or more keywords;
        searching a data source using the one or more keywords for the assistance associated with the first electronic task;
        determining whether the assistance provides for modifying the first electronic task or for generating a new electronic task;
        if the assistance provides for modifying the first electronic task, modifying the first electronic task to include the assistance associated with the first electronic task, the assistance including one or more of:
            modifying the first electronic task to include help content; and
            modifying the first electronic task to include a selectable link to the help content;
        if the assistance provides for generating the new electronic task, generating a second electronic task that includes the assistance associated with the first electronic task; and
    presenting the second electronic task or the modified first electronic task and the associated help content in a task list user interface.

2. The method of claim 1,
    wherein searching the data source for the assistance associated with the first electronic task includes searching the data source for application functionality for performing the first electronic task; and
    providing the assistance associated with the first electronic task includes launching the application functionality for performing the first electronic task.

3. The method of claim 1,
    wherein searching the data source for the assistance associated with the first electronic task includes searching the data source for the help content associated with the first electronic task.

4. The method of claim 1, wherein searching the data source for the assistance associated with the first electronic task includes using the text string of the first electronic task as a search phrase for searching the data source for the assistance associated with the first electronic task.

5. The method of claim 4, wherein using the text string of the first electronic task as the search phrase for searching the data source for the assistance associated with the first electronic task includes using the one or more keywords parsed from the text string of the first electronic task as the one or more keywords for searching the data source for the assistance associated with the first electronic task.

6. The method of claim 5, wherein using the one or more keywords parsed from the text string of the first electronic task as the one or more keywords for searching the data source for the assistance associated with the first electronic task includes matching one or more words parsed from the text string against a list of predefined words for developing a search string for searching the data source for the assistance associated with the first electronic task.

7. The method of claim 1, wherein searching the data source for the assistance associated with the first electronic task includes searching the data source for the assistance with the first electronic task based on one or more user task performance preferences.

8. The method of claim 1, wherein receiving the first electronic task includes receiving the first electronic task based on upon a reminder to perform the first electronic task.

9. The method of claim 1, wherein receiving the first electronic task is in response to receiving a selection of the first electronic task.

10. The method of claim 1, wherein receiving the first electronic task is in response to the first electronic task being positioned at the top of a task list in which the first electronic task is listed.

11. The method of claim 1, wherein modifying the first electronic task to include the help content associated with the first electronic task includes modifying the first electronic task to provide the help content in a separate user interface.

12. The method of claim 1, wherein modifying the first electronic task to include the help content associated with the first electronic task includes importing a task template for providing one or more subtasks to the first electronic task for performing the first electronic task.

13. The method of claim 3, further comprising displaying the help content associated with the first electronic task in a user interface separate from a presentation of the modified first electronic task.

14. The method of claim 3, wherein in response to a selection of the help content item displayed in association with the modified first electronic task, providing the help content item in a help content user interface.

15. A computer readable storage medium having stored thereon computer executable instructions which when executed by a computer perform a method for providing assistance in association with an electronic task, comprising:
    receiving a first electronic task;
    in response to receiving the first electronic task, performing the following operations:
        parsing a text string of the first electronic task for one or more keywords;
        searching a data source using the one or more keywords for assistance associated with the first electronic task;
        determining whether the assistance provides for modifying the first electronic task or for generating a new electronic task;
        if the assistance provides for modifying the first electronic task, modifying the first electronic task to include the assistance associated with the first electronic task; and
        if the assistance provides for generating the new electronic task, generating a second electronic task that includes the assistance associated with the first electronic task, the assistance including one or more of:
            modifying the first electronic task to include help content; and
            modifying the first electronic task to include a selectable link to the help content; and presenting the second electronic task or the modified first electronic task and the associated help content in a task list user interface.

16. The computer readable storage medium of claim 15, wherein searching the data source for the assistance associated with the first electronic task includes searching the data source for application functionality for performing the first electronic task; and wherein providing the assistance associated with the first electronic task includes launching the application functionality for performing the first electronic task.

17. The computer readable storage medium of claim 15, wherein searching the data source for the assistance associated with the first electronic task includes searching the data source for the help content associated with the first electronic task; and presenting the modified first electronic task and the associated help content in the task list user interface.

18. The computer readable storage medium of claim 15, wherein using the text string of the first electronic task as a search phrase for searching the data source includes matching one or more words parsed from the text string against a list of predefined words for developing a search string for searching the data source for the assistance associated with the first electronic task.

19. A system for providing help content in association with an electronic task, comprising:
  a processor;
  a memory coupled to the processor; and
  a personal assistant application stored in the memory, the personal assistant application is executed by the processor to:
    receive a first electronic task;
    in response to receiving the first electronic task, perform the following operations:
      parse a text string of the first electronic task for one or more keywords;
      search a data source using the one or more keywords for assistance associated with the first electronic task;
      determine whether the assistance provides for modifying the first electronic task or for generating a new electronic task;
    if the assistance provides for modifying the first electronic task, modify the first electronic task to include the assistance in association with the first electronic task, the assistance including one or more of:
      modifying the first electronic task to include the help content; and
      modifying the first electronic task to include a selectable link to the help content;
    if the assistance provides for generating the new electronic task, generate a second electronic task that includes the assistance associated with the first electronic task; and
    present the second electronic task or the modified first electronic task and the associated help content in a task list user interface.

20. The system of claim 19, the personal assistant application being further operative to:
  search the data source for application functionality for performing the first electronic task; and
  provide the assistance associated with the first electronic task by launching the application functionality for performing the first electronic task.

* * * * *